United States Patent
Lavigne et al.

(10) Patent No.: US 8,327,031 B2
(45) Date of Patent: *Dec. 4, 2012

(54) SUPPORT CHIP FOR HANDLING NETWORK CHIPS ON A NETWORK DEVICE

(75) Inventors: Bruce E. Lavigne, Roseville, CA (US); John A. Wickeraad, Granite Bay, CA (US); Lewis S. Kootstra, Roseville, CA (US); Jonathan M. Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2432 days.

This patent is subject to a terminal disclaimer.

(21) Appl. No.: 11/054,646

(22) Filed: Feb. 8, 2005

(65) Prior Publication Data

US 2006/0176899 A1    Aug. 10, 2006

(51) Int. Cl.
G06F 15/16    (2006.01)
(52) U.S. Cl. ...................................... 709/250
(58) Field of Classification Search .............. 710/20; 370/359, 360; 709/250
See application file for complete search history.

(56) References Cited

U.S. PATENT DOCUMENTS

| | | | |
|---|---|---|---|
| 5,276,899 A * | 1/1994 | Neches | 709/240 |
| 5,583,867 A * | 12/1996 | Poole | 370/257 |
| 5,675,735 A * | 10/1997 | Gallagher et al. | 709/228 |
| 5,751,710 A * | 5/1998 | Crowther et al. | 370/423 |
| 6,078,963 A * | 6/2000 | Civanlar et al. | 709/238 |
| 6,160,809 A * | 12/2000 | Adiletta et al. | 370/392 |
| 6,172,990 B1 * | 1/2001 | Deb et al. | 370/474 |
| 6,430,626 B1 * | 8/2002 | Witkowski et al. | 709/249 |
| 6,496,477 B1 | 12/2002 | Perkins et al. | |
| 6,701,088 B1 | 3/2004 | Watanabe et al. | |
| 6,762,763 B1 | 7/2004 | Migdal et al. | |
| 6,785,270 B1 | 8/2004 | Parrish et al. | |
| 6,792,348 B2 | 9/2004 | Hameleers et al. | |
| 7,009,996 B1 * | 3/2006 | Eddy et al. | 370/463 |
| 7,693,976 B2 * | 4/2010 | Perry et al. | 709/223 |
| 2002/0078290 A1 * | 6/2002 | Derrico et al. | 710/302 |
| 2003/0110339 A1 * | 6/2003 | Calvignac et al. | 710/305 |

OTHER PUBLICATIONS

Galles, M. "Spider: a high-speed network interconnect." Micro, IEEE, vol. 17, No. 1: pp. 34-39, Jan./Feb. 1997.*
Brown, Lisa S. "100VG-AnyLAN 15-port hub design." Hewlett-Packard Journal, v46: pp. 39-42. Aug. 1995.*

* cited by examiner

*Primary Examiner* — Christopher Biagini

(57) ABSTRACT

Network devices and methods are provided involving a support chip in association with network chips. One embodiment includes a network device having a processor, a high speed interconnect, and a number of network chips coupled to one another through the high speed interconnect. The number of network chips include a conduit port which can be selectively chosen to exchange packets, received to the number of network chips, with the processor. The support chip is coupled to the number of network chips in association with selecting a conduit port on one of the number of network chips to exchange packets with the processor.

35 Claims, 3 Drawing Sheets

SUPPORT CHIP FOR HANDLING NETWORK CHIPS ON A NETWORK DEVICE

BACKGROUND

Computing networks can include multiple network devices such as routers, switches, hubs, servers, desktop PCs, laptops, and workstations, among other peripheral devices, e.g., printers, facsimile devices, and scanners, networked together across a local area network (LAN) and/or wide area network (WAN). Internal to many of these network devices, there is often a processor responsible for processing packets used in the network device's global operation.

One approach to providing packets received at the external network ports to a processor on the network device, i.e., the processor responsible for processing the packets used in the network device's global operation, was to put the processor access in a central place such as in the switching fabric. This approach introduces complex port forwarding logic into an otherwise straightforward crossbar switching fabric and introduces two sets of code to keep in step with one another. Moreover, the approach is not available in a small network chip configuration which may not use a switching fabric chip.

Another approach to providing packets received at the external network ports to the processor responsible for processing those packets has been to provide a special management blade, e.g., processor and memory chip dedicated to handling the exchange of those packets. In this approach, the network device is hard coded so that all of this particular processor traffic goes through the management blade. A disadvantage to this approach is that, if the management blade fails or needs to be removed, the entire network device is down.

Another approach has been to provide simultaneous connections from each network chip to the particular processor for processing these packets. The disadvantage to this approach is cost. That is, the particular processor will have as many media access control-physical layer (MAC-PHY) ports as there are network chips on the network device which does not scale particularly well. Moreover, this approach becomes more cumbersome when the network device endeavors to provide redundancy among the processors responsible for processing the packets in the event a given processor is busy or down.

DETAILED DESCRIPTION

Embodiments of the present invention provide a conduit path for packets to flow to and from a processor responsible for processing packets used in a network device's operation. The embodiments allow for reusing much of the pre-existing forwarding and buffering structure of a given network device, e.g., a switch or router's forwarding and buffering structure.

According to various embodiments, network chips (e.g., application specific integrated circuits (ASICs)) are provided with an additional network port (hereinafter referred to as a "conduit" port) internal to the device for the purpose of exchanging packets with the processor responsible for processing the packets. The additional conduit port is a media access control-physical layer (MAC-PHY) type port and includes logic circuitry associated therewith to achieve the embodiments described herein.

The conduit port on one or more network chips of a given device includes a transmit and a receive side, e.g., output and input side. In one example embodiment, the output side of each conduit port is coupled to a multiplexor, allowing one network chip's conduit port to send packets to the processor's input port to the exclusion of other network chips. In this embodiment, the processor's output port is coupled to a buffer, allowing packets to be broadcast to the input side of each network chip's conduit port. According to various embodiments, hardware filtering logic on the network chip allows a given network chip to operate on packets relevant to that given network chip.

Figure 1:
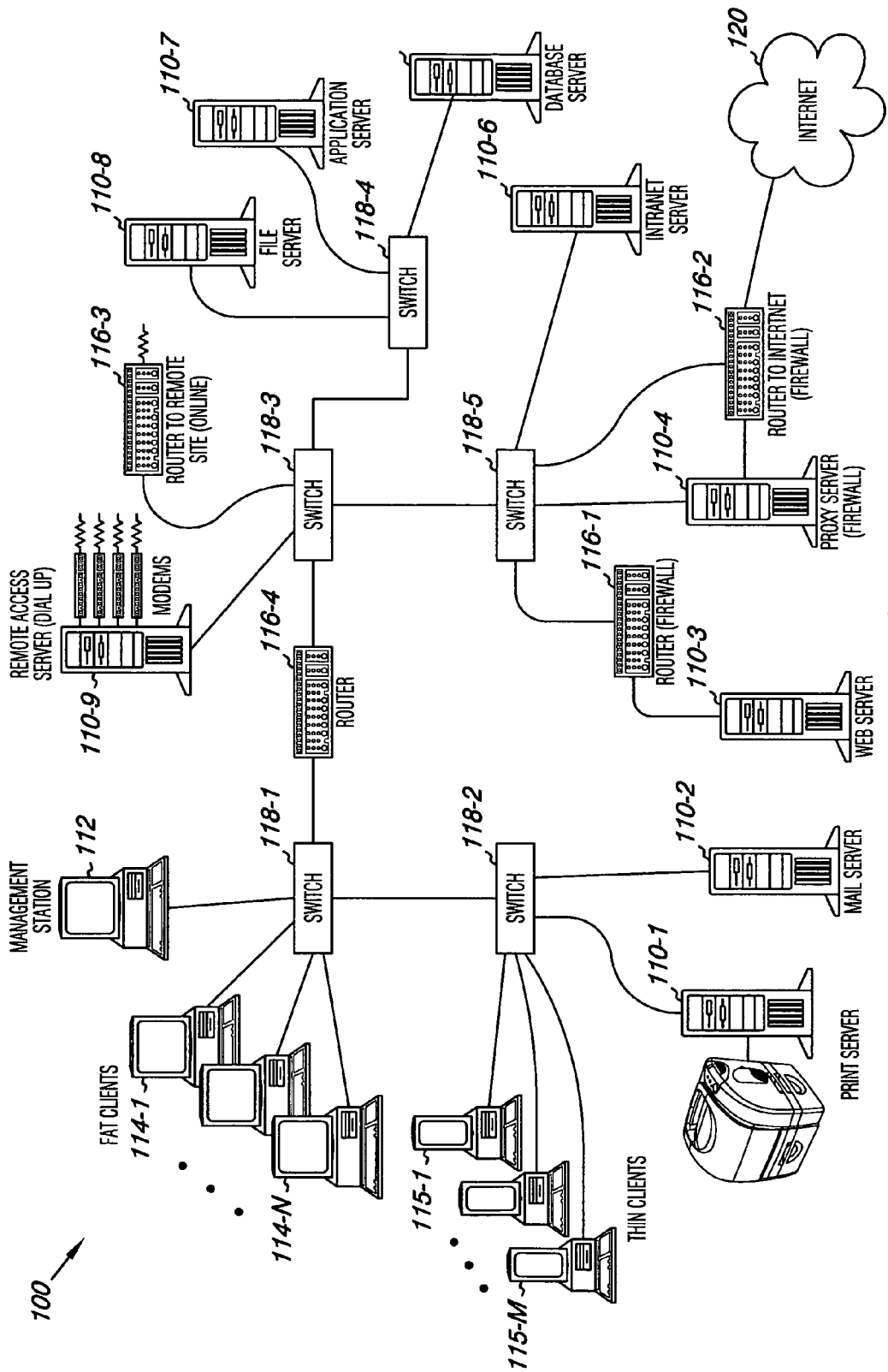
FIG. 1 is an embodiment of a computing device network.

FIG. 1 is an embodiment of a computing device network 100. As shown in FIG. 1, a number of devices, e.g., PCs, servers, peripherals, etc., can be networked together via a LAN and/or WAN via routers, hubs, switches, and the like (referred to herein as "network devices"). The embodiment of FIG. 1 illustrates clients and servers in a LAN. However, embodiments of the invention are not so limited. For example, the embodiment of FIG. 1 shows various servers for various types of service on a LAN.

The exemplary network of FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. Again, the examples provided here do not provide an exhaustive list. The embodiment of FIG. 1 further illustrates a network management station 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multifunction device, and the like.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. Embodiments of the invention, however, are not limited to the number and/or type of network devices in FIG. 1's illustration.

As one of ordinary skill in the art will appreciate, many of these devices include processor and memory hardware. By way of example and not by way of limitation, the network management station 112 will include a processor and memory as the same are well known to one of ordinary skill in the art. Similarly, the network devices of routers, 116-1, 116-2, 116-3, and 116-4, and hubs and/or switches 118-1, 118-2, 118-3, 118-4, and 118-5 may include processor and memory resources. Embodiments of the invention are not limited, for the various devices in the network, to the number, type, or size of processor and memory resources.

Program instructions (e.g., computer executable instructions), as described in more detail below, can reside on the various network devices. For example, program instructions in the form of firmware, software, etc., can be resident on the network 100 in the memory of a network management station 112 and/or one or more routers, 116-1, 116-2, 116-3, and 116-4, and hubs and/or switches 118-1, 118-2, 118-3, 118-4, and 118-5, and be executable by the processor(s) thereon. As the reader will appreciate, program instructions can be resident in a number of locations on various network devices in the network 100 as employed in a distributed computing network.

By way of further example, program instructions in conjunction with a network management program can employ a protocol such as simple network management protocol (SNMP), routing information protocol (RIP), address resolution protocol (ARP), etc., to exchange data and collect response information from the various network attached devices shown in FIG. 1. That is, various network devices are employed to exchange network control signals and to transfer data packets, such as Ethernet frame packets as the same are known and understood, across the network 100 for various usage.

A processor on a given network device may communicate with other network devices using SNMP, RIP, ARP, or other networking protocols. Additionally, the processor on a given network device may communicate with local processors on network chips (described in more detail in connection with FIGS. 2A and 2B) using some proprietary protocol, SNMP, RIP, ARP, or other networking protocols.

Figure 2A:
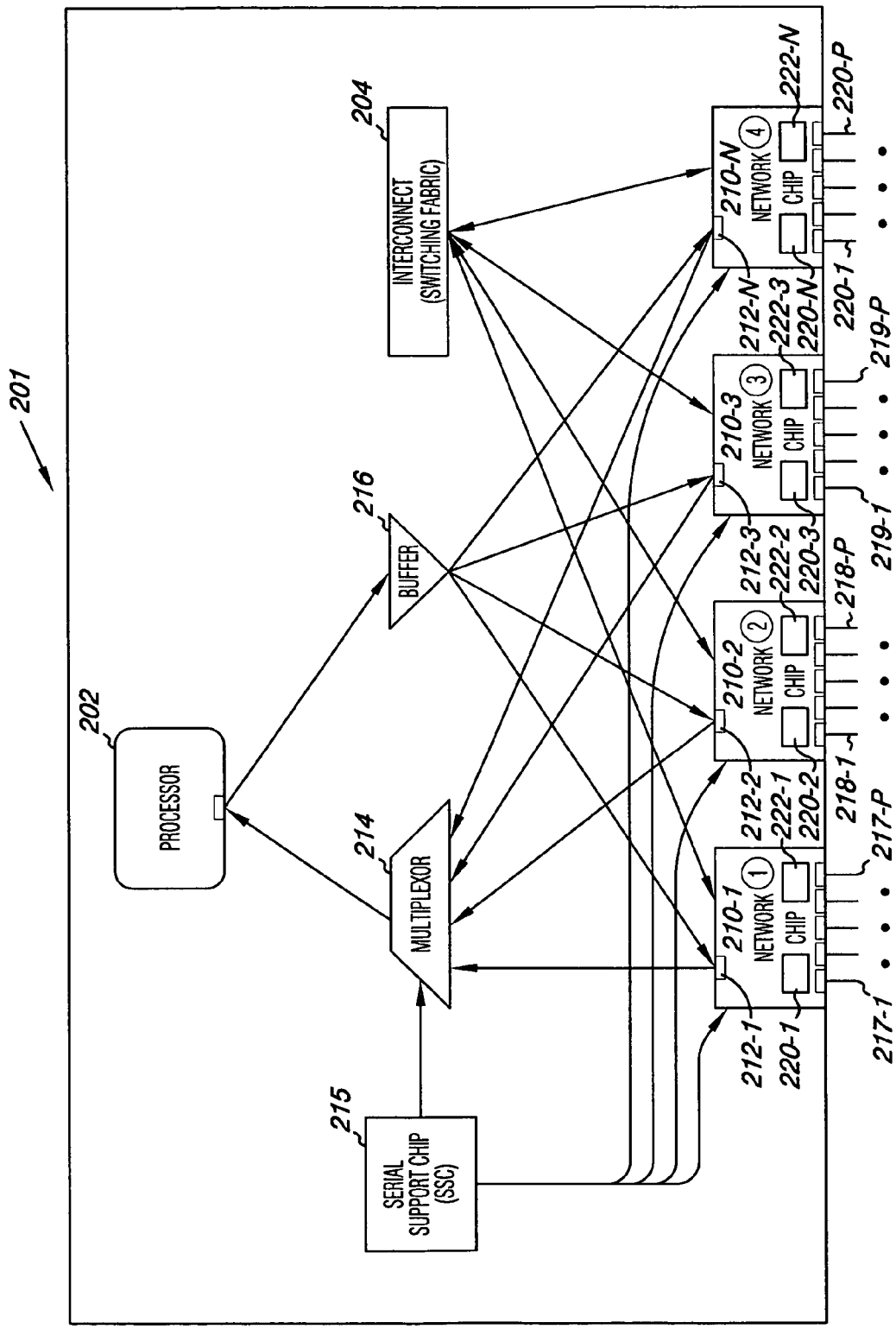
FIG. 2A illustrates an embodiment for a network device providing a conduit between a processor and network chips thereon.

FIG. 2A illustrates an embodiment for a network device 201 providing a conduit between a processor and network chips thereon. That is, FIG. 2A can represent a switch, a router, and/or other network devices, such as those illustrated and discussed in connection with FIG. 1. As shown in FIG. 2A, the network device 201 includes at least one processor 202 responsible for processing packets, used in the network device's operation, which are received to network chips on the device, e.g., network chips 210-1, 210-2, 210-3, . . . , 210-O. The network chips may be application specific integrated circuits (ASICs). The designator "O" is used to indicate that a number of network chips can be included on the network device 201. Each of these network chips may have access to processor and memory resources, shown as 220-1, 220-2, 220-3, . . . , 220-O and 222-1, 222-2, 222-3, . . . , 222-O respectively. As illustrated in FIG. 2A, the number of network chips 210-1, 210-2, 210-3, . . . , 210-O can be connected to one another through a high speed interconnect, e.g., switching fabric or crossbar circuit, 204 as the same are known and understood by one of ordinary skill in the art. Embodiments are not limited to the number of network chips included on a given network device 201.

Each of the number of network chips 210-1, 210-2, 210-3, . . . , 210-O are provided with external ports to handle the exchange of data packets, e.g., Ethernet packets, (hereinafter "packets") to and from the network device 201. For example, the network chip 210-1 is illustrated with external ports 217-1, . . . , 217-P. Network chip 210-2 is illustrated with external ports 218-1, . . . , 218-P. Network chip 210-3 is illustrated with external ports 219-1, . . . , 219-P. Network chip 210-0 is illustrated with external ports 221-1, . . . , 221-P. The designator "P" is used to indicate that a number of external ports can be included on a given network chip. Each of the network chips, however, does not have to include the same number of external ports. For example, one network chip, e.g., 210-1, could include 24 external ports where "P"=24, and another network chip, e.g., 210-3, could include 32 external ports where "P"=32, etc.

As noted above, internal to switches/routers, there is often a processor, e.g., 202, which processes packets of importance to the switch/router's global operation. These packets may arrive from an external network port, e.g., ports 217-1, . . . , 217-P, 218-1, . . . , 218-P, 219-1, . . . , 219-P, 221-1, . . . , 221-P (thus network chips, e.g., 210-1, 210-2, 210-3, . . . , 210-O) and will have to be funneled to the processor 202 in an efficient manner. Previous approaches to doing so were described at the start of this application.

In contrast to earlier approaches, the embodiment of FIG. 2A provides a "conduit path", described in more detail below, for these packets to flow to and from the processor 202, re-using much of the pre-existing forwarding and buffering structure of the switch/router. The number of network chips 210-1, 210-2, 210-3, . . . , 210-O are provided with a designated "conduit port", shown as 212-1, 212-2, 212-3, . . . , 212-O respectively, for the purpose of exchanging packets with a processor, e.g., processor 202 responsible for processing the packets used in the device's 201 operation. FIG. 2A illustrates each of the number of network chips 210-1, 210-2, 210-3, . . . , 210-O being provided with a designated conduit port 212-1, 212-2, 212-3, . . . , 212-O. However, embodiments are not limited to this example and, as the reader will appreciate, there may be a number of additional network chips on a given network device 201 which do not include the herein described conduit port.

In one embodiment the conduit port 212-1, 212-2, 212-3, . . . , 212-O is an additional media access control-physical layer (MAC-PHY) port and includes logic circuitry associated therewith to achieve the embodiments described herein. That is, the additional MAC-PHY ports 212-1, 212-2, 212-3, . . . , 212-O can include MAC-PHY ports such as those used in local area/wide area networks (LAN/WANs) for external ports operating at 10/100/1000/10000 Mb/s speeds as the same will be known and recognized by one of ordinary skill in the art.

Each of these "conduit ports" 212-1, 212-2, 212-3, . . . , 212-O includes a media access control (MAC) functionality. Thus, each of these conduit ports 212-1, 212-2, 212-3, . . . , 212-O has a transmit and a receive side, i.e., output and input side, as part of its hardware structure. And, each of these conduit ports 212-1, 212-2, 212-3, . . . , 212-O is intended to selectively serve as part of a conduit path between the processor responsible for processing packets, e.g., 202, received to a network chip, e.g., 210-1, 210-2, 210-3, . . . , 210-O, and used in the operation of the network device 201.

As shown in FIG. 2A, the processor 202 is separate from the high speed interconnect 204. In one embodiment the processor 202 includes a single conduit port 213 (as "conduit port" has been defined herein) to receive packets from a selected conduit port 212-1, 212-2, 212-3, . . . , 212-O on one of the number of network chips 210-1, 210-2, 210-3, . . . , 210-O. The single conduit port 213 on the processor may similarly be a standard MAC-PHY port as used in local area/wide area networks (LAN/WANs) operating at 10/100/1000/10000 Mb/s speeds.

The reader will appreciate that the conduit port 213 on the processor 202 to receive packets from the selected conduit port 212-1, 212-2, 212-3, . . . , 212-O on one of the number of network chips 210-1, 210-2, 210-3, . . . , 210-O may be "built-in" to the processor 202. Additionally, the conduit port 213 may be external in the sense that the processor 202 may be a set of integrated circuit chips including processor, network interface card (NIC), and memory resources combined, etc.

The conduit port 213 has a receive side and a transmit side, i.e., input side and output side, as part of its hardware structure. The processor 202 on the network device 201 exchanges packets with a selected conduit port on one of the number of network chips, e.g., conduit port 212-1 on network chip 210-1, through a multiplexor 214 and a buffer 216. That is, the selected conduit port 212-1 is selected, e.g., controlled, by the multiplexor 214 and sends packets to an input side of the processor conduit port 213 associated with the processor 202.

An output of each network chip conduit port 212-1, 212-2, 212-3, ..., 212-O on the number of network chips 210-1, 210-2, 210-3, ..., 210-O is coupled to the multiplexor 214. In various embodiments, such as the embodiment illustrated in FIG. 2A, a support chip (e.g., serial support chip (SSC)) can be used to choose a selected conduit port, e.g., conduit port 212-1, to send packets to the processor 202. For example, the support chip can include a list of available network chips that can be used and can include a protocol for selecting a network chip to act as the conduit.

The support chip can be connected to the available network chips. In this way, in various embodiments, the support chip can also include a protocol to instruct the network chips which network chip has been selected as the conduit.

In this manner, the functions of selecting a conduit port can be achieved by a separate, and in some cases, dedicated chip. This arrangement can be beneficial, for example, because the switching from one conduit on a network chip to another can be effectuated more quickly.

As stated above, the support chip can contain a list of which network chips can be used to act as a selected conduit between the processor and one or more of the network chips. The list can be in a suitable format and can be organized in various ways. For example, the list can be a list of available network chips or can be organized, for example, in a hierarchy by chip speed, by availability, by proximity to the processor, or by another such suitable criteria.

The use of a list can allow for a number of possible choices with respect to the selection of a replacement conduit port. For example, if the selected conduit and the first choice on the list of available network chips are disconnected, the protocol can be used to select another network chip from the list.

The list can also be an actively changing list of available network chips. For example, the network chips can be monitored and can be added or removed from the list. One way in which this can be accomplished is through use of a presence pin, as described in more detail below. In such embodiments, the information regarding whether the presence pin is connected or disconnected can be used to determine whether the network chip should be on the list or not. Additionally, the list information can also be used in conjunction with the information provided by presence and active pins, as are described in more detail below.

The support chip can be used to switch from a selected port to another selected port, for example, when a network chip or port is deactivated or disconnected. In this way, output from a processor to a network chip can be forwarded to another network chip (e.g., for local processing on another network chip, via high speed interconnect). For instance, packets can be received by an external port on a network chip. Based upon the change from a currently selected network chip to a replacement network chip, the packets can be forwarded to the selected replacement network chip's conduit port.

The initiation of a switch from one port to another can be provided in any suitable manner. For instance, the indication that a network chip is being disconnected can be identified by the SSC and can be sent by the SSC to the network chips (e.g., all of the network chips, all active network chips, or selected network chips, among other groupings of network chips).

In various embodiments, this transition can begin immediately upon the detection of a presence pin being disconnected. In some embodiments, the multiplexor selector may not change the selection of the conduit chip for a period of time. In this way, the network can finish routing the packets from the network chip being disconnected before changing the selection of the conduit network chip.

In such embodiments; since the network chips have already been informed about the disconnection of the current conduit network chip and which network chip is to be the re-placement conduit chip, the network chips can route their packets to the replacement chip even though the multiplexor has not been switched. The packets that have been routed to the replacement conduit chip can be held by the replacement chip until the multiplexor selector is changed by the SSC.

In some embodiments, the indication of a disconnection can be accomplished through the use of pins having different lengths. For example, each network chip that can be used as a conduit can include a number of pins. Examples of pins that can be provided include a presence pin, a power pin, a ground pin, a conduit pin, and a high speed link pin, and an active pin, to name a few.

These pins can be used to provide connections to the network device which can be used for communication with the support chip. For example, the presence pin can be used to signal the support chip to indicate that the network chip, to which the pin is connected, is available on the device. The active pin can be used to signal the support chip to indicate that the network chip has been initialized, for example.

In various embodiments, the presence pin for a network chip can be used to initiate the transition from the currently selected conduit port to another. For example, the support chip can interpret the absence of a signal from the presence pin as an indication that the pin has been disconnected (e.g., the card is in the process of being removed).

In some embodiments, one or more of the other pins can be longer than the presence and/or the active pin. In this way, the longer pins can be constructed such that the longer pin or pins (e.g., power, ground, conduit, and/or high speed link pins) stay connected long enough to allow the transition of conduit traffic away from the chip being disconnected before the chip loses power or connection with the high speed interconnect.

For example, in some embodiments, the power, ground, conduit, active and high speed link pins can be longer than the presence pin. In such embodiments, the longer pins can be used to route packets to the selected replacement conduit, among other functions.

In some embodiments, when the presence pin is disconnected, the support chip can signal to the network chips that the disconnection is taking place. In such embodiments, the network traffic to and from the network chips can be suspended to allow for the remaining packets on the disconnecting network chip to be processed or re-routed more quickly.

The signaling of the disconnection of the selected conduit port can provide an indication to the network chips to begin routing their communications to another network chip. Once the selection of a replacement conduit port has been initiated, the selection information can be communicated to the network chips and communications can be routed to the replacement conduit.

In various embodiments, the conduit port can be connected to a selector that can be used to select the conduit port when a currently selected network conduit has been disconnected. The selector is a multiplexor, for example. In such embodiments, the support chip can be used to communicate the disconnection of the currently selected conduit port and/or the transition from the currently selected conduit port to another. The support chip 215 can communicate a disconnection of the selected network chip to the selector. When a list is used to determine the selected network chip, the support chip, based upon the list, can instruct the selector to begin communicating with the selected replacement network chip.

The support chip can be connected to a multiplexor, such as is shown in FIG. 2A. In such embodiments, the multiplexor 214 can be connected to the support chip 215 and to the conduit ports 212-1, 212-2, 212-3, and 212-O of the number of network chips that can be used as a conduit. In some embodiments, the multiplexor 214 can be used to connect the multiple conduit ports 212-1, 212-2, 212-3, and 212-O of the network chips to a processor 202 having one conduit port 213 thereon. The support chip 215 can communicate a disconnection of the selected network chip to the multiplexor 214. When a list is used to determine the selected network chip, the support chip, based upon the list, can instruct the multiplexor to begin communicating with the selected replacement network chip.

The transition of the conduit from one network chip to another can be accomplished in a number of ways. For example, when a network chip is removed, the disconnection of the presence pin can indicate that the network chip is being disconnected. If one or more of the other pins are longer than the presence pin, the longer pins can continue to route packets or reroute the packets to the replacement network chip that is to provide the conduit.

The support chip can communicate to the network chips which network chips are active and which network chip is the conduit to the processor. This communication can be accomplished, for example, through use of a serially arranged set of bits sent to each network chip.

Additionally, the support chip can direct the transition from one network chip to another by sending or directing the selector to make the selection of the replacement network chip. The selection can be communicated to the replacement network chip as one bit, for example, indicating that the network chip is now the conduit. Based upon receipt of the information regarding the particular network chip's selection as the conduit, the network chip can execute computer executable instructions to begin routing packets to the processor.

The support chip can also indicate to each of the network chips which network chip has been selected and, in some embodiments, the status of each network chip. The selection of a network chip to act as the conduit can be accomplished based upon the sending of an identifier such as a number assigned to the selected network chip.

For example, the support chip can initiate the sending of an identifier in the form of a serial bit sequence that indicates a number. Four or five bit numbers, for example, can be used such that each network chip can be assigned a unique number. In such embodiments, a network having 32 network chips can be used where each network chip has a different five bit number. The status can be provided in any suitable manner, such as a one or more bit flag providing an indicator as to whether the network chip is active.

An output side of the conduit port 213 of the processor 202 is broadcast through the buffer 216 to an input side of the selected conduit port, e.g., 212-1. In various embodiments, the buffer 216 broadcasts an output from the conduit port 213 on the processor 202 to an input side of each of the conduit ports 212-1, 212-2, 212-3, . . . , 212-O on the number of network chips 210-1, 210-2, 210-3, . . . , 210-O. According to various embodiments, hardware filtering logic is provided on each of the network chips 210-1, 210-2, 210-3, . . . , 210-O as part of the conduit ports 212-1, 212-2, 212-3, . . . , 212-O such that respective network chip can operate on packets received from the processor conduit port 213.

By way of example, and not by way of limitation, a network chip can filter packets based on a media access controller (MAC) destination address (DA) (also referred to as a destination MAC address), e.g., presented as the first 6 bytes in a packet. That is, in one mode, each network chip contains a 6 byte compare register, and if the value of the destination MAC address matches, then the packet is accepted by the particular network chip's conduit port.

In another mode, for example with 32 network chips present, the low 33 bits of the destination MAC address (or DA_MAC) are used as a bitfield. In this example, each network chip knows which bit to look at to accept or drop the packet. In this example, the $33^{rd}$ bit can be special and indicate to allow the one network chip which is currently serving as the conduit port, i.e., the one which the multiplexor has selected in the other direction, to be the only network chip which accepts the packet.

This approach has practicality when a packet is to be sent from the processor 202 out an external port. That is, it is practical to have just one network chip forwarding the packet on without having to give a lot of consideration to which network chip may be best suited. In other words, if the one network chip which is currently serving as the conduit port was good enough to get packets to the processor 202, then it is good enough to get packets out of the processor 202.

In some embodiments, a subset of the conduit ports 212-1, 212-2, 212-3, . . . , 212-O on the number of network chips 210-1, 210-2, 210-3, . . . , 210-O are coupled to the multiplexor 214. In such embodiments, an output of the processor conduit port 213 is broadcast through the buffer 216 to an input side of the subset of the conduit ports 212-1, 212-2, 212-3, . . . , 212-O on the number of network chips 210-1, 210-2, 210-3, . . . , 210-O. Additionally, the number of conduit ports receiving packets ("listeners") from the buffer 216 does not have to equal the number of conduit ports which are selectable by the multiplexor 214 to send ("talkers") packets to the processor 202.

In various embodiments, each network chip will know which network chip is currently serving as the conduit port, i.e., the one which the SSC 215 has selected, to send packets to the processor 202. In this manner, each network chip will know which network chip to send packets, e.g., via the interconnect 204, in order to use the conduit.

Thus, packets can be received to an external port, e.g., 217-1, . . . , 217-P, 218-1, . . . , 218-P, 219-1, . . . , 219-P, 221-1, . . . , 221-P (thus a network chip, e.g., 210-1, 210-2, 210-3, . . . , 210-O), on the device 201 and will be forwarded to the selected conduit port, e.g., 212-1, to which the processor 202 is "listening" via the high speed interconnect 204. The particular conduit port from among the number of conduit ports 212-1, 212-2, 212-3, . . . , 212-O is selected by the multiplexor 214 and sends packets to an input side of the processor conduit port 213.

Processed packets are broadcast from the output side of the single conduit port 213 of the processor 202 through the buffer 216 to the input side of the number of conduit ports 212-1, 212-2, 212-3, . . . , 212-O where the processed packets can be operated upon and forwarded out an external port, e.g., 217-1, . . . , 217-P, 218-1, . . . , 218-P, 219-1, . . . , 219-P, 221-1, . . . , 221-P (thus a network chip, e.g., 210-1, 210-2, 210-3, . . . , 210-O on the device 201) via the high speed interconnect 204. Similarly, the processed packets can be forwarded to local processing on the receiving network chip or on another network chip 210-1, 210-2, 210-3, . . . , 210-O via the high speed interconnect 204.

Again, as noted above, in various embodiments a subset of the conduit ports 212-1, 212-2, 212-3, . . . , 212-O on the number of network chips 210-1, 210-2, 210-3, . . . , 210-O are coupled to the multiplexor 214. In such embodiments, an output of the processor conduit port 213 is broadcast through the buffer 216 to an input side of the subset of the conduit ports 212-1, 212-2, 212-3, . . . , 212-O on the number of network chips 210-1, 210-2, 210-3, . . . , 210-O. Additionally, the number of conduit ports receiving packets ("listeners") from the buffer 216 does not have to equal the number of conduit ports which are selectable by the multiplexor 214 to send ("talkers") packets to the processor 202.

As the reader will appreciate, the processor associated multiplexor and buffer pair 214 and 216, described in connection with FIG. 2A, can be replaced, or used in combination, with a hub and/or switch.

Figure 2B:
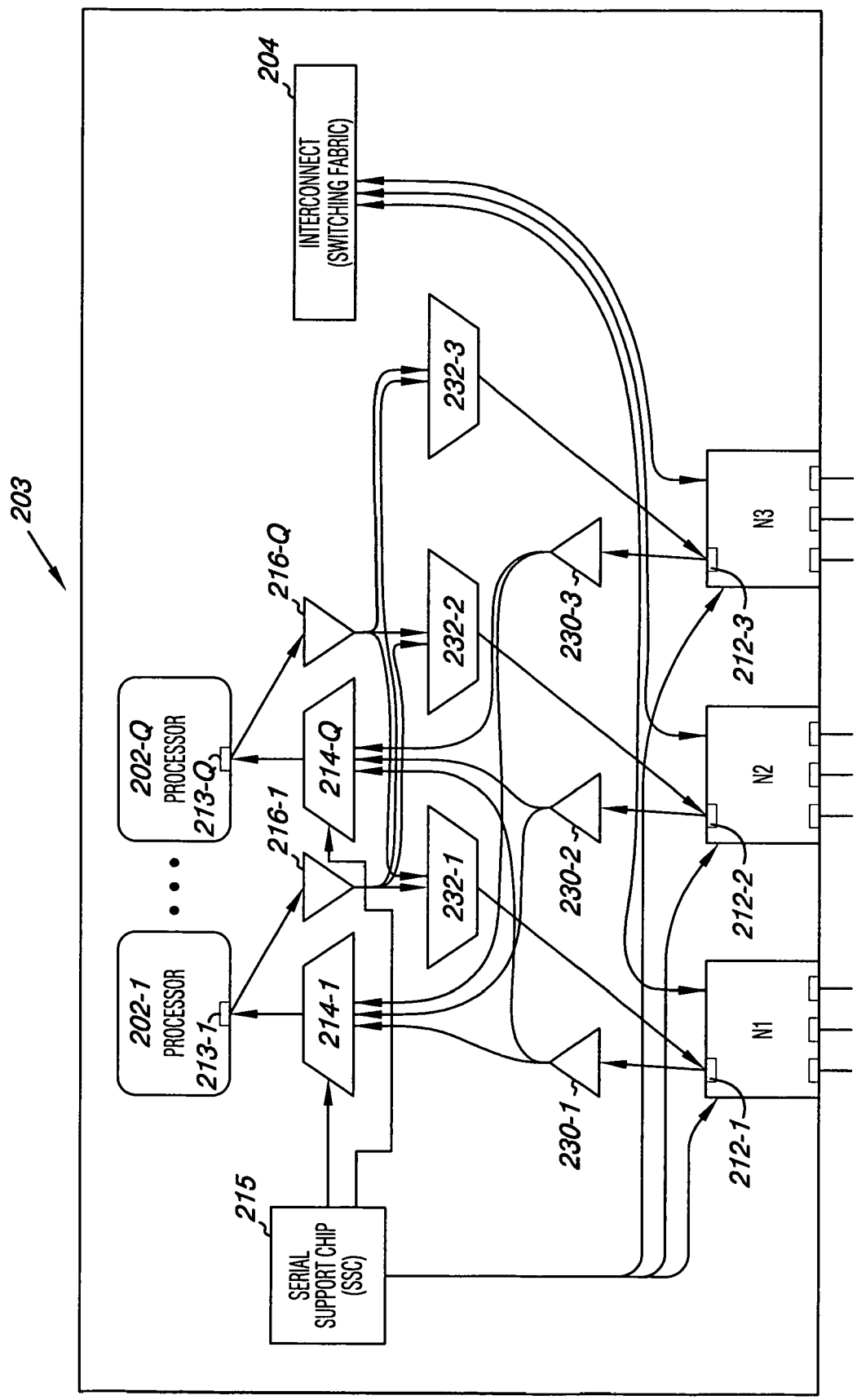
FIG. 2B illustrates another embodiment for a network device providing conduits between multiple processors and network chips thereon.

FIG. 2B illustrates another embodiment for a network device 203 providing conduits between multiple processors and network chips thereon. The embodiment of FIG. 2B is analogous to the device discussed in connection with FIG. 2A. FIG. 2B, however, illustrates that a given network device 203 can include a number of processors 202-1, . . . , 202-Q to provide redundancy and/or multiple active processor resources on the device 203. In this embodiment, each of the processors 202-1, . . . , 202-Q responsible for processing packets exchanged to and from the external ports, e.g., 217-1, . . . , 217-P, 218-1, . . . , 218-P, 219-1, . . . , 219-P, 221-1, . . . , 221-P of the network chips 210-1, 210-2, 210-3, . . . , 210-O on the device 203 will similarly include a designated conduit port 213-1, . . . , 213-Q to exchange packets with the number of network chips 210-1, 210-2, 210-3, . . . , 210-O through an associated multiplexor and buffer pair, shown as 214-1, . . . , 214-Q, and 216-1, . . . , 216-Q, respectively. The designator "Q" is used to indicate that a number of redundant and/or multiple active processors responsible for processing packets exchanged to and from the external ports, e.g., 217-1, . . . , 217-P, 218-1, . . . , 218-P, 219-1, . . . , 219-P, 221-1, . . . , 221-P of the network chips 210-1, 210-2, 210-3, . . . , 210-O on the device 203.

In FIG. 2B, three network chips are shown for ease of illustration, however, more or less network chips can be utilized. The three network chips illustrated are labeled "N1", "N2", and "N3" and are analogous to the network chips described in connection with FIG. 2A with external ports and a designated conduit port, e.g., 212-1, 212-2, and 212-3, etc. However, as illustrated in the embodiment of FIG. 2B, the output side of each network chip's conduit port 212-1, 212-2, and 212-3 will be connected to a respective, independent buffer 230-1, 230-2, and 230-3 which will broadcast packets to the respective multiplexors 214-1, . . . , 214-Q. As described in connection with FIG. 2A, a given multiplexor 214-1, . . . , 214-Q will select from which conduit port 212-1, 212-2, and 212-3 to send packets to that multiplexor's associated processor.

As described in connection with FIG. 2A, packets from a particular processor 202-1, . . . , 202-Q will be output to that processor's associated buffer, e.g., 216-1, . . . , 216-Q. However, as illustrated in the embodiment of FIG. 2B, the broadcast from buffers 216-1, . . . , 216-Q will be to a multiplexor 232-1, 232-2, and 232-3 associated with a particular network chip, e.g., N1, N2, and N3, respectively. These multiplexors 232-1, 232-2, and 232-3 will select from which buffer 216-1, . . . , 216-Q broadcast output to the input side of its associated network chip's conduit port, e.g., 212-1, 212-2, and 212-3, respectively.

As the reader will appreciate, network chip "N1" can be selected to "listen" to packet traffic from processor 202-Q via the selection made by multiplexor 214 as directed by SSC 215. Likewise, network chip N1 could be selected by multiplexor 214 as directed by SSC 215 as having the conduit port to send packets to processor 202-1. Additionally, network chip "N3" can be selecting to "listen" to packet traffic from processor 202-1 via the selection made by multiplexor 214 as directed by SSC 215. And likewise, network chip "N3" could be selected by multiplexor 214 as directed by SSC 215 as having the conduit port to send packets to processor 202-Q.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network device, comprising:
a processor including a conduit port;
a multiplexor coupled to the conduit port of the processor;
an interconnect;
a plurality of network chips coupled to one another through the interconnect, where each of the plurality of network chips includes a conduit port coupled to the multiplexor; and
a support chip coupled to the plurality of network chips, wherein the support chip is to select a particular one of the plurality of network chips to send packets to the processor through the multiplexor as a conduit for a remainder of the plurality of network chips, and wherein the remainder of network chips are to send packets via the interconnect and the particular one of the plurality of network chips to the processor.

2. The network device of claim 1, wherein the support chip is a serial support chip (SSC) which contains a list of which network chips are selectable as a conduit between the processor and the plurality of network chips.

3. The network device of claim 2, wherein each of the plurality of network chips includes a presence pin providing connections to the device which communicate with the SSC.

4. The network device of claim 3, wherein the presence pin signals the SSC to indicate a particular network chip's presence on the device and an active pin signals the SSC to indicate that the particular network chip is initialized.

5. The network device of claim 4, wherein a disconnect of the presence pin for a network chip having a currently selected conduit port signals the SSC to make a transition to another network chip's conduit port.

6. The network device of claim 5 wherein the SSC communicates the transition to the multiplexor.

7. The network device of claim 6, wherein each network chip includes a hardware configuration in which at least one other pin is longer than the presence pin.

8. A network device, comprising:
a plurality of network chips coupled to one another through an interconnect on the device, wherein each of the plurality of network chips includes a conduit port coupled to a multiplexor;
a serial support chip (SSC) connected to the plurality of network chips, wherein the SSC contains a list of which network chips are selectable to exchange packets received the plurality of network chips with a processor responsible for processing packets and is to select a particular one of the plurality of network chips from the list to send packets to the processor through the multiplexor as a selected conduit port for a remainder of the plurality of network chips, and wherein the remainder of network chips are to send packets via the interconnect and the particular one of the plurality of network chips to the processor; and
wherein the plurality of network chips include a presence pin.

9. The network device of claim 8, wherein the multiplexor connects a selected conduit port on one of the plurality of network chips to a processor having a single conduit port to receive packets from the selected conduit port.

10. The network device of claim 8, wherein the SSC is to instruct the plurality of network chips which network chip currently has the selected conduit port.

11. The network device of claim 10, wherein a disconnect of the presence pin for a network chip having a currently selected conduit port signals the SSC to begin sending packets to a different network chip's conduit port.

12. The network device of claim 11, wherein the SSC communicates the disconnect to the multiplexor and based on the list instructs the multiplexor to begin connecting the different network chip's conduit port to the processor.

13. The network device of claim 12, wherein the list includes a hierarchy of network chips which are selectable as the conduit between the processor and the plurality of network chips.

14. The network device of claim 13, wherein the SSC operates on the list to instruct the multiplexor which different network chip's conduit port to use based on the hierarchy and on signals from a presence pin and an active pin for each of the plurality of network chips on the list.

15. The network device of claim 14, wherein each network chip includes a hardware configuration in which at least one other pin is longer than the presence pin.

16. The network device of claim 8, wherein the network device is selected from the group of a router and a switch.

17. The network device of claim 8, wherein the device is part of a local area network (LAN).

18. A network device, comprising:
a plurality of network chips coupled to one another through an interconnect on the device, wherein each of the plurality of network chips includes a conduit port coupled to a multiplexor;
a processor responsible for processing packets received the plurality of network chips, wherein the processor includes a single conduit port to receive packets from the plurality of network chips via the multiplexor; and
a support chip to select a particular conduit port on one of the plurality of network chips to exchange packets with the processor through the multiplexor as a conduit for a remainder of the plurality of network chips, and wherein the remainder of network chips are to send packets via the interconnect and the particular conduit port of the one of the plurality of network chips to the processor.

19. The network device of claim 18, wherein the support chip comprises a serial support chip (SSC) coupled to each of the plurality of network chips and to the multiplexor.

20. The network device of claim 19, wherein the SSC includes a presence pin on each of the plurality of network chips.

21. The network device of claim 20, wherein a disconnect of the presence pin for a network chip having a currently selected conduit port signals the SSC to begin sending packets to a different network chip's conduit port based on a list.

22. The network device of claim 21, wherein the SSC communicates the disconnect to the multiplexor and based on the list instructs the multiplexor to begin connecting the different network chip's conduit port to the processor.

23. The network device of claim 22, wherein the list includes a hierarchy of network chips that are selectable as a conduit between the processor and the plurality of network chips.

24. The network device of claim 23, wherein the SSC operates on the list to instruct the multiplexor which different network chip's conduit port to use based the hierarchy and on signals from the presence pin for each of the plurality of network chips on the list.

25. A method for moving packets on a network device, comprising:
using an interconnect to connect a plurality of network chips on the device;
coupling a conduit port on each of the plurality of network chips to a multiplexor, wherein the multiplexor selects one conduit port from among the conduit ports on each of the plurality of network chips to connect through the multiplexor with a processor responsible for processing packets received to the plurality of network chips;
coupling a support chip to each of the plurality of network chips and to the multiplexor;
receiving a disconnect signal from a presence pin on a network chip whose conduit port is currently the one conduit port connected to the processor; and
using a protocol from the support chip to instruct the plurality of network chips to begin sending packets to a different network chip's conduit port to the processor through the multiplexor based on a list.

26. The method of claim 25, wherein the method includes, based on the list, instructing the multiplexor to begin connecting the different network chip's conduit port to the processor and using the support chip to communicate the disconnect signal to the multiplexor.

27. The method of claim 25, wherein the method includes forwarding an output, from the processor, to the conduit port, on one of the network chips, to local processing on another network chip via the interconnect.

28. A method for moving packets on a network device, comprising:
coupling a plurality of network chips to one another through an interconnect of the device, each of the plurality of network chips having a conduit port coupled to a processor through a multiplexor, wherein each of the conduit ports is to be selectively chosen to exchange packets with the processor, wherein the processor is responsible for processing packets;
coupling a serial support chip (SSC) to each of the plurality of network chips and to the multiplexor, wherein each conduit port on the plurality of network chips is coupled to the multiplexor, wherein the SSC is to select a particular one of the plurality of network chips to send packets to the processor through the multiplexor as a conduit for a remainder of the plurality of network chips, and wherein the remainder of network chips are to send packets via the interconnect and the particular one of the plurality of network chips to the processor; and providing each network chip with a presence pin.

29. The method of claim 28, wherein the presence pin signals the SSC to indicate a particular network chip's presence on the device and an active pin signals the SSC to indicate that the particular network chip is initialized.

30. The method of claim 28, wherein the method includes receiving a disconnect signal from a presence pin on a network chip whose conduit port is currently the one conduit port connected to the processor.

31. The method of claim 30, wherein the method includes using the protocol from the support chip to instruct the plurality of network chips to begin sending packets to a different network chip's conduit port based on a list.

32. The method of claim 29, wherein the method includes receiving packets to an external port on the plurality of network chips on the device and forwarding the packets to the different network chip's conduit port via the interconnect.

33. The method of claim 32, wherein the method includes communicating the disconnect signal to the multiplexor such that the multiplexor connects the different network chip's conduit port to the processor.

34. The method of claim 33, wherein the method includes providing a hardware configuration in which the active pin is longer than the presence pin.

35. The method of claim 34, wherein the method includes allowing a disconnected network chip to complete an exchange of packets prior to the multiplexor connecting the different network chip's conduit port to the processor.

* * * * *

UNITED STATES PATENT AND TRADEMARK OFFICE
CERTIFICATE OF CORRECTION

PATENT NO. : 8,327,031 B2
APPLICATION NO. : 11/054646
DATED : December 4, 2012
INVENTOR(S) : Bruce E. Lavigne et al.

Page 1 of 1

It is certified that error appears in the above-identified patent and that said Letters Patent is hereby corrected as shown below:

In the Claims:

In column 11, line 12, in Claim 8, delete "received the" and insert -- received by the --, therefor.

In column 11, line 59, in Claim 18, delete "received the" and insert -- received by the --, therefor.

Signed and Sealed this
First Day of October, 2013

Teresa Stanek Rea
*Deputy Director of the United States Patent and Trademark Office*